Figures 1, 2:
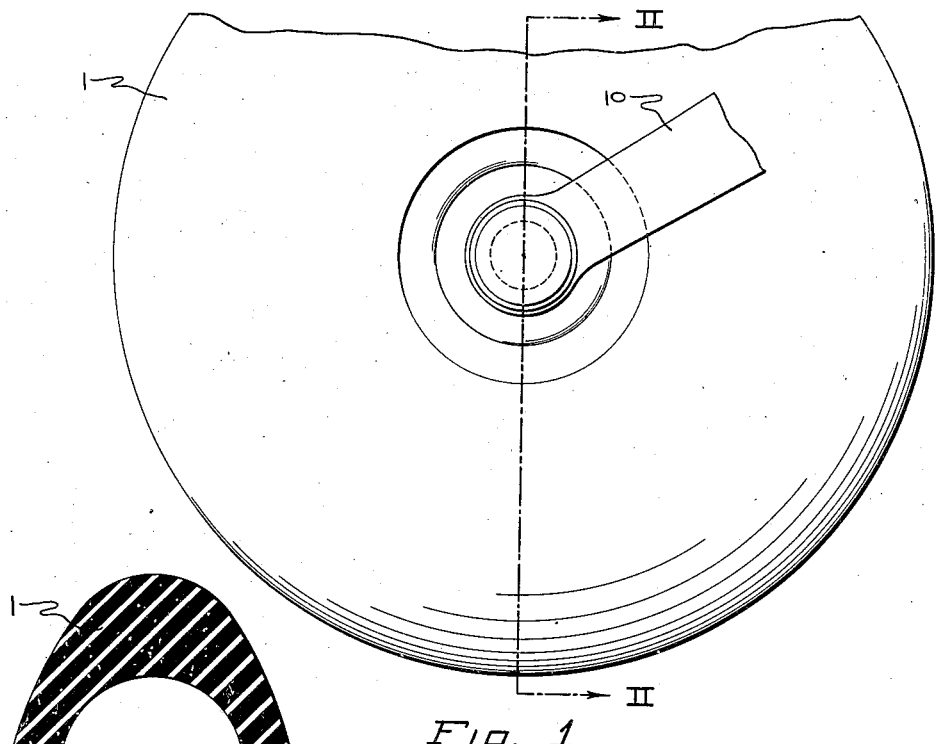

Oct. 19, 1943.                H. D. CORWIN                2,332,131
                                 WHEEL
                           Filed Sept. 13, 1941

Inventor
HOWARD D. CORWIN
By Beaman & Langford
          Attorneys

Patented Oct. 19, 1943

2,332,131

UNITED STATES PATENT OFFICE 2,332,131

WHEEL

Howard D. Corwin, Jackson, Mich., assignor to Lake State Products, Inc., Jackson, Mich., a corporation of Michigan Application September 13, 1941, Serial No. 410,726

8 Claims. (Cl. 301—5)

The present invention relates to small wheels, and particularly tail wheels for airplanes.

The invention is particularly concerned with the provision of a simple inexpensive hub and wheel structure for wheel assemblies, being designed to facilitate the changing of tires and the assembling of the hub structure with their tires. It is common practice in the production of small wheels to permanently secure the tires and hub structures together so that when a tire wears out the entire wheel with its hub structure must be discarded. According to the present invention, the tire may be readily replaced.

An object of the present invention is to provide a hub structure in two halves, which may be clamped within the hub opening of a tire to support the tire and provide a complete wheel assembly.

Another object of the invention is to provide a hub structure having opposed tubular members for insertion in the opposite sides of a wheel tire for constituting the wheel and hub.

A still further object of the invention is to provide a wheel hub having opposed tubular members constituting the wheel hub, these tubular members having bearing seats and means to maintain the tubular members in alignment, the parts being held together by the wheel supporting axle and its nut.

These and other objects residing in the arrangement, combination and construction of the parts will be apparent from the following specification when taken with the accompanying drawing, in which Fig. 1 is a side view of a wheel and a part of its supporting arm according to the present invention, and Fig. 2 is a section on the line II—II of Fig. 1.

Referring particularly to the drawing, the reference character 1 indicates a tire which may be of any suitable construction, as for instance solid rubber or of hollow rubber. The tire 1 is provided with a hub opening 2, in which is disposed a pair of tubular members 3. The tubular members 3 at the outer ends thereof are provided with substantially radially extending flanges 4 which abut against the outside faces of the tire 1. If desired the flanges 4 may be dished inwardly as shown to bite into the sides of the tire 1 to prevent the entrance of dirt behind the flanges 4. The inner ends of the tubular members 3 are provided with radially offset restricted portions 5, which are opposed to each other and provide in the tubular members 3 seats 6 for bearings 7. Preferably the tubular members 3 and their flanges 4 are sheet metal stampings. However, if desired they may be turned.

Disposed about the offset restricted portions 5 is a cylindrical sleeve 8 in telescopic relation with the restricted portions 5 for maintaining them in axial alignment. It will be observed that the offset of the portions 5 provide an annular recess 9 in which the sleeve 8 is disposed.

The wheel is supported by a conventional arm 10 having an axle 11 extending through a bore 12 in the end thereof. The axle 11 is provided with a sleeve 13 disposed between the inner race of the bearing 7 adjacent the arm 10 and the shoulder 14 of the arm 10. The outer end of the axle 11 is threaded and is provided with a nut 15 bearing against the inner race of the outer bearing 7. By taking up on the nut 15, the bearings 7 are clamped between the nut 15, and the collar 13 and shoulder 14 urging the tubular members 3 inwardly and their flanges 4 into clamping relation with the outer faces of the tire 1, thus securing the hub portion of the wheel, constituted by the tubular members 3, in assembled relation with the tire 1, yet at the same time permitting ready disassembling for changing the tire 1 when the same becomes worn.

The inner ends of the tubular members 3 abut as shown, so that when the nut 15 is taken up, the tubular members 3 are held positively together in a rigid unit. Alternatively the tubular members 3 may be held positively together by a rigid unit, by causing the outsides of the seats 6 to bear against the sleeve 8 in a manner not shown but which will be clear from the drawing. The hub opening 2 in the tire 1 may be cylindrical or it may be shaped to substantially conform to the external configuration of the tubular members 3, together with the sleeve 8.

At the side of the wheel adjacent the arm 10 there is provided a grease seal 20 for preventing the escape of grease from the adjacent bearing 7, and at the side of the wheel opposite the arm 10 there is provided a hub cap 21 which serves to retain the grease of the outer bearing 7 and at the same time provides the wheel with a finished appearance.

While the invention has been particularly described with reference to a tail wheel for airplanes, it will be understood that it is equally adaptable to wheels for other purposes, such as, for example, trucks, roller skates, and the like.

Having thus described my invention, what I desire to secure by Letters Patent and claim is:

1. A hub assembly comprising a pair of separable tubular members, each of said members having inner edges and outer substantially radially extending flanges for bearing against the outside of a wheel, a tubular sleeve for telescopic disposal over at least a part of the outer surfaces of said tubular members and the inner ends of said tubular members, and seats inwardly of the outer ends of said tubular members for receiving bearings.

2. A hub assembly for a wheel consisting of a pair of separable tubular members, each of said members having inner edges and outer substantially radially extending flanges for bearing against the outside of a tire, seats inwardly of the outer ends of said tubular members for receiving bearings, and bearings in said seats, said assembly being arranged so that clamping pressure axially inwardly against said bearings clamps said flanges against the outside of said wheel.

3. In combination, a wheel having a hub opening, a pair of separable tubular members having inner edges and substantially radially extending flanges for bearing against the outside of the wheel when the tubular members are disposed in said hub opening, means for aligning said tubular members, seats inwardly of the outer ends of said tubular members for receiving bearings, bearing on said seats, an axle extending through said bearings, and means on said axle to clamp said bearings against said seats, to clamp said tubular members together, and to clamp said flanges against said wheel, whereby said wheel is supported by said flanges and said tubular members comprise a hub structure.

4. In combination, a wheel having a hub opening, a pair of separable tubular members having inner edges, said inner edges being adapted to be arranged in contiguous relation within said hub opening, a sleeve telescoped over said inner edges and at least a part of the outer surfaces of said tubular members for maintaining said tubular members in alignment within said hub opening, means for maintaining said tubular members in a predetermined axial relation with respect to said wheel, seats inwardly of the outer end of said tubular members for receiving bearings, bearings on said seats, an axle extending through said bearings, and means on said axle to clamp said bearings against said seats and to clamp said tubular members together, whereby said wheel is supported by said flanges and said tubular members comprise a hub structure.

5. In combination, a wheel having a hub opening, a pair of separable tubular members having inner edges, said inner edges being adapted to be arranged in contiguous relation within said hub opening, means for maintaining said tubular members in a predetermined axial position with respect to said wheel, means for aligning said tubular members, seats inwardly of the outer ends of said tubular members for receiving bearings, bearings on said seats, an axle extending through said bearings, and means on said axle to clamp said bearings against said seats and to clamp said tubular members together, whereby said wheel is supported by said tubular members which comprise a hub structure.

6. In combination, a wheel of resilient material having a hub opening, a pair of separable tubular members having inner edges, said inner edges being adapted to be arranged in contiguous relation within said hub opening, said tubular members having substantially radially extending flanges for bearing against the outside of said wheel when said tubular members are disposed in said hub opening, means for aligning said tubular members, seats inwardly of the outer ends of said tubular members for receiving bearings, bearings on said seats, an axle extending through said bearings, and means on said axle to clamp said bearings against said seats, said flanges against the outside of said wheel, and said tubular members together, whereby said wheel is supported by said tubular members and flanges, and said tubular members comprise a hub structure.

7. In combination, a wheel of resilient material having a hub opening, a pair of separable tubular members having inner edges, said inner edges being adapted to be arranged in contiguous relation within said hub opening, said tubular members having substantially radially extending flanges for bearing against the outside of said wheel when the tubular members are disposed in said hub opening, means for aligning said tubular members, integral shoulders in said tubular members within the outer ends of said tubular members comprising seats for receiving bearings, bearings on said seats, an axle extending through said bearings, and means on said axle to clamp said bearings against said seats, said flanges against the outside of said wheel, and said tubular members together, whereby said wheel is supported by said tubular members and flanges, and said tubular members comprise a hub structure.

8. A hub assembly comprising a pair of sheet metal tubular stampings, each of said stampings having outer substantially radially extending flanges for bearing against the outside of a wheel and restricted inner portions, said restricted inner portions providing seats within said stampings inwardly from the outer ends thereof for receiving bearings, said restricted portions also providing, when said stampings are butted together, an annular recess, and a sleeve telescoped on said restricted portions and disposed in said annular recess for maintaining said stampings in alignment.

HOWARD D. CORWIN.